United States Patent
Guo

(10) Patent No.: US 12,401,810 B2
(45) Date of Patent: Aug. 26, 2025

(54) METHODS AND APPARATUS TO IMPLEMENT SCALABLE VIDEO CODING FOR DISTRIBUTED SOURCE AND CLIENT APPLICATIONS

(71) Applicant: Intel Corporation, Santa Clara, CA (US)

(72) Inventor: Yejun Guo, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/573,159

(22) PCT Filed: Sep. 23, 2021

(86) PCT No.: PCT/CN2021/119933
§ 371 (c)(1),
(2) Date: Dec. 21, 2023

(87) PCT Pub. No.: WO2023/044669
PCT Pub. Date: Mar. 30, 2023

(65) Prior Publication Data
US 2024/0292007 A1    Aug. 29, 2024

(51) Int. Cl.
*H04N 7/12*       (2006.01)
*H04N 19/172*     (2014.01)
(Continued)

(52) U.S. Cl.
CPC ......... *H04N 19/395* (2014.11); *H04N 19/172* (2014.11); *H04N 19/42* (2014.11)

(58) Field of Classification Search
CPC ..................................................... H04N 19/70
See application file for complete search history.

(56) References Cited

U.S. PATENT DOCUMENTS

2016/0261877 A1    9/2016    Wang

FOREIGN PATENT DOCUMENTS

CN    110784720 A    2/2020
CN    111669515 A    9/2020

OTHER PUBLICATIONS

Tektronix, "A Guide to MPEG Fundamentals and Protocol Analysis: Updated with QoS/QoE Diagnostics and Troubleshooting," May 2012, 108 pages.
(Continued)

*Primary Examiner* — Y Lee
(74) *Attorney, Agent, or Firm* — Hanley, Flight & Zimmerman, LLC

(57) ABSTRACT

Methods, apparatus, systems, and articles of manufacture are disclosed that distribute video data encoded with scalable video coding. A remote data source analyzes the graphics system of one or more client device(s), generates a full video frame data and a base-layer video frame, encodes an auxiliary-layer bitstream, and transmits the bitstream to the client device(s). The remote data source does not need to encode or transmit a base-layer bitstream. The client device(s) generates a base-layer frame data, decodes the auxiliary-layer bitstream into an auxiliary-layer frame data, and reconstructs a full video frame based on the second base-layer frame data and the auxiliary-layer frame data. The methods, apparatus, systems, and articles of manufacture disclosed herein save bandwidth by transmitting only the auxiliary-layer bitstream to one or more of the client device(s) without a base-layer bitstream. The client device(s) graphics system is utilized to generate its own base-layer frame data.

15 Claims, 11 Drawing Sheets

(51) Int. Cl.
  *H04N 19/30* (2014.01)
  *H04N 19/42* (2014.01)

(56) References Cited

OTHER PUBLICATIONS

Yao Wang, "Video Processing & Communications: Scalable Video Coding," 2006, 46 pages.
Yao Wang, "Image and Video Processing: Video Coding Standards and Scalable Coding," 2015, 79 pages.
Schwarz et al., "The Scalable Video Coding Extension of the H.264/AVC Standard," IEEE Signal Processing Magazine, Mar. 2008, 7 pages.
Thomas Wiegand, "Scalable Video Coding in H.264/AVC," Fraunhofer—Institut Nachrichtentechnik Heinrich-Hertz-Institut, Apr. 2004, 69 pages.
Patent Cooperation Treaty, "International Search Report," issued in connection with International Patent Application No. PCT/CN2021/119933, mailed on Jun. 14, 2022, 3 pages.
Patent Cooperation Treaty, "Written Opinion of the International Searching Authority," issued in connection with International Patent Application No. PCT/CN2021/119933, mailed on Jun. 14, 2022, 4 pages.

# METHODS AND APPARATUS TO IMPLEMENT SCALABLE VIDEO CODING FOR DISTRIBUTED SOURCE AND CLIENT APPLICATIONS

RELATED APPLICATION(S)

This arises from the U.S. National Stage of International Patent Application No. PCT/CN2021/119933, which is titled "METHODS AND APPARATUS TO IMPLEMENT SCALABLE VIDEO CODING FOR DISTRIBUTED SOURCE AND CLIENT APPLICATIONS," and which was filed on Sep. 23, 2021. Priority to International Patent Application No. PCT/CN2021/119933 is claimed. International Patent Application No. PCT/CN2021/119933 is incorporated herein by reference in its entirety.

FIELD OF THE DISCLOSURE

This disclosure relates generally to video coding and, more particularly, to methods and apparatus to implement scalable video coding for distributed source and client applications.

BACKGROUND

Video coding standards set by the Moving Picture Experts Group (MPEG) such as MPEG-2, H.264/AVC (Advanced Video Coding), and HEVC (High Efficiency Video Coding) have led to significant developments in digital video storage and streaming applications. Each of these standards define techniques for video codecs to perform encoding and decoding of video files. For example, MPEG encoding techniques are able to decrease the size of digital video files via compression and then decode the encoded digital video files via decompression. The compression of video data files allows videos to be stored and/or transmitted efficiently.

While the above examples of video coding have led to significant advancements in video storage and streaming technologies, the development of scalable video coding has further improved video compression and decompression capabilities. Scalable video coding (SVC) is an extension of the H.264/AVC standard that increases the coding efficiency of a video bitstream relative to traditional single-layer coding with the H.264/AVC standard. One difference between SVC and single-layer coding is that SVC can divide encoded video data into subsets of bitstreams, which can then be partially transmitted and decoded. The subsets of bitstreams include a base-layer bitstream and one or more other auxiliary-layer bitstream(s). In some examples, the auxiliary-layer bitstreams can be referred to as enhanced-layer bitstreams or enhancement-layer bitstreams. SVC has numerous applications, including, but limited to, to video conferencing, digital video streaming, three-dimensional (3D) modeling, cloud gaming from remote servers across various networks, etc.

Figure 1:
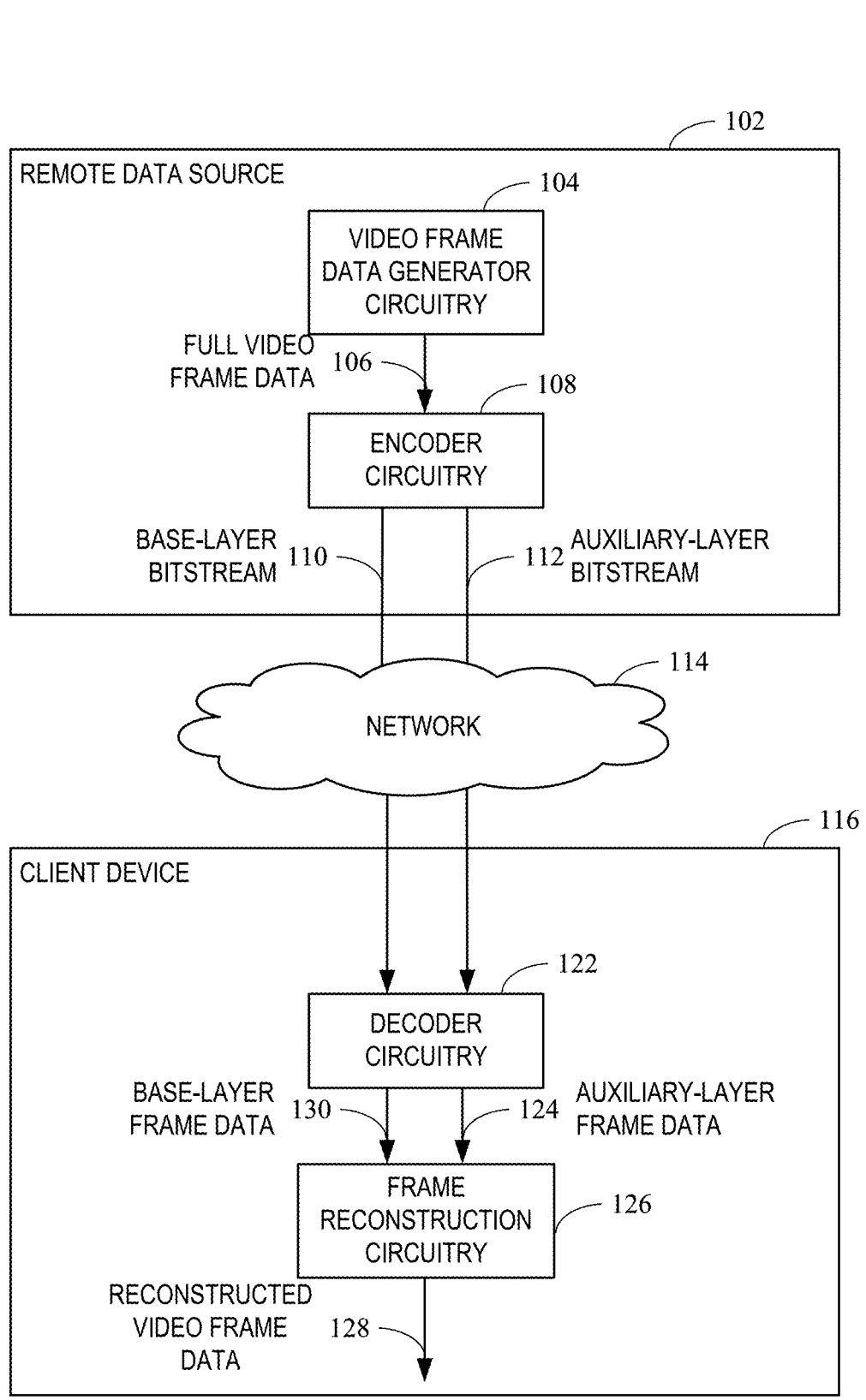
FIG. 1 is a block diagram of an example distributed scalable video coding system.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

As mentioned above, scalable video coding (SVC) divides encoded video data into subsets of bitstreams, which include a base-layer bitstream and one or more other auxiliary-layer bitstream(s). Different varieties of SVC can include spatial, temporal, and/or fidelity scalability, meaning that the base-layer bitstream can represent lower resolution, lower frame rate, and/or lower quality than the full video frame data. While there are many forms of scalability, SVC generally involves compressing the video frame data into subsets that include the base-layer bitstream and one or more other auxiliary-layer bitstream(s). Each subset of auxiliary-layer bitstreams incrementally add layers of resolution, frame rate, and/or quality to the decoded video signal.

SVC can provide adaptability to video streaming by dropping subsets that are not critical to the video. Therefore, a system using SVC can adjust to deficient network connections, bandwidth restrictions, and/or potentially disparate client technologies, even though dropping subsets may decrease the video resolution, quality, etc. For example, when transmitting video frame data encoded with SVC, a mobile phone might receive only the base-layer bitstream from a distributed streaming source, while a high-powered video gaming console might receive all the bitstream subsets. However, neither device will experience an interruption in the streaming video signal.

A benefit that arises from using SVC for video streaming is the ability to transmit a variety of spatial or temporal resolutions or qualities by dropping subsets of bitstream data to account for bandwidth restrictions or heterogeneous client hardware. While this can result in a reduction in spatial resolution or fidelity (relative to the full frame data), it can also provide an increase in decoding efficiency (relative to single-layer video coding). In other words, the lowest resolution or quality bitstream (i.e., the base-layer bitstream) can be decoded by a majority of legacy decoders. Since SVC offers this forward compatibility, bitstream data can be taken in by legacy equipment that can decode only the base-layer bitstream, while more advanced and/or potential future hardware can decode the base-layer bitstream and auxiliary-layer data to achieve higher resolution and/or quality.

Some examples of SVC apply a combination of techniques to improve or maintain encoding and decoding efficiency while reducing bandwidth consumption relative to single-layer video coding. One of these techniques is motion compensation. Motion compensation relies on the likelihood that only the subject or the camera moves in most video frame sequences. This assumption can allow an example algorithm to predict an example video frame based on previous frames, future frames, and/or the orientation of objects within the video frames.

An example encoder using SVC can encode the full image data of the reference video frames (I-frames), while encoding just the image data of the transitional frames (P-frames and B-frames) that are different from the reference frames. At the decoding stage, an example decoder using SVC can use motion compensation to predict the missing image data in the P-frames from the preceding I-frame. The example decoder using SVC can also use motion compensation to predict the missing image data in the B-frames from the preceding, full-data, P-frame and the following, partial-data, P-frame.

In some examples, encoders and decoders using SVC can utilize discrete cosine transform (DCT), quantization, and variable length coding (VLC) for compressing video frame data, and the inverse discrete cosine transform (IDCT), inverse quantization, and variable length decoding (VLD) for decompressing the compressed video frame data.

The DCT is a form of lossy compression, or irreversible compression, which is a method of encoding that uses approximations and partial data to represent the example video frame data. The DCT can transform the example video frame from the spatial domain into the frequency domain. The human eye is less sensitive to higher spatial frequencies than lower spatial frequencies, so some higher spatial frequencies may be removed from the encoded data in some instances.

In some examples, pixels of the video frame are separated into a number of sections of varying importance based on the contribution of the pixel section to the overall quality of the video frame. These pixel sections serve as the input data for the DCT and are referred to as macroblocks. Macroblocks can range from 4×4 to 32×32, depending on the sophistication of the codec. Each value within the macroblock is a representation of the importance of that pixel sample to the overall quality of the image. Once the DCT is performed on the macroblock, the result is an 8×8 array of DCT coefficients but with 64 values of spatial frequencies instead of discrete points.

In some examples, the example DCT coefficient matrix can be quantized by a quantization matrix and a quantizer scale code. The example DCT coefficient matrix is first multiplied by the example quantizer scale code so the DCT coefficients are scaled up in value. Then, each component of the example DCT coefficient matrix is divided by the associated component in the quantization matrix and rounded to the nearest whole integer. Since the largest absolute values in the DCT coefficient matrix are typically of the lowest frequency and the smallest absolute values in the DCT coefficient matrix are typically of the highest frequency, many of the high frequency DCT coefficients are rounded to zero in the quantization computations Once the example DCT coefficient matrix has been quantized, those values can be assigned a code with a variable number of bits. This process is known as variable length coding (VLC) and is typically a step in the SVC compression process that is lossless (i.e., reversible without any data loss). Typically, VLC will result in a different string of bits for each different input value and can concatenate the strings into an example bitstream. With VLC, more important DCT coefficients (e.g., the lowest frequency and highest quantized value) are assigned more bits while less important coefficients (e.g., highest frequency and typically zero quantized value) are assigned fewer bits.

To apply the inverse discrete cosine transform (IDCT), inverse quantization (IQ), and variable length decoding (VLD) to decode a compressed example video frame, the reverse steps of the above mentioned processes are performed. The bits for each example sample of the 8 by 8 block are read as inputs and variable length decoded into the matrix of values that resulted from the quantization step mentioned above. This is then inverse quantized using the same quantization matrix and quantizer scale code used at the example compression stage. To inverse quantize the matrix, each component is multiplied by the associated component in the quantization matrix and then divided by the quantizer scale code. Since many of the example values in the decoded matrix will be zero, those components are unable to be decoded through IQ.

Once VLD is performed on the example bitstream and IQ are performed on the bitstream, the IDCT can then operate on the 8 by 8 array of DCT coefficients with a formula that is similar to that of the DCT but with slight variations to some coefficients therein depending on the type of example video frame data being compressed. The process can be performed on each macroblock to recreate each section of the example video frame, which can then be assembled to recreate the example video frame. The example video frame can closely resemble the original depending on the approximation error or how appropriately the importance of the DCT coefficients were determined by the quantization matrix and/or quantization scale code value assignments.

In some examples, a video frame data generator can generate a video frame from a sequence of three-dimensional (3D) video frames rendered by an example 3D video game graphics engine. The example 3D video game can use an example OpenGL application programming interface (API) and an example graphics processing unit (GPU) to render the vide frame sequence. OpenGL is a portable and commonly applied graphics API specification that can be used across multiple platforms and is standardized and periodically updated by a review board. OpenGL can typically interact with an example GPU to accelerate the rendering of an example 3D video sequence associated with an example 3D video game.

The example OpenGL graphics API mentioned above can operate on an OpenGL Shading Language (GLSL), which is a programming language that can manipulate the contents of example video frame data in an 3D video game. In this example, a shader is a program written in the GLSL that can provide access to certain rendering stages of the video frame as well as other resources within the program, such as uniforms, uniform buffer objects, and shader storage buffer objects. A uniform is a global shader variable which can be stored in memory locations within an object. An object of the example GLSL can be a type of construct (i.e., programming language syntax) that contains some state, which can refer to the current memory contents stored as one or more uniform variable(s) within the object. An object can also be bound to another entity of data with an identifier or incremented with an index. If an identifier is bound to an object, the identifier can reference that same object if it is ever called. If indices are incremented in sequence of generated video frames, the index can indicate the proper placement of the frame within the sequence. The object can also store an array of uniform variables, in which case it can be referred to as a uniform buffer object. A shader storage buffer object (SSBO) is like a uniform buffer object, except it can be up to 8,000 times larger and can access incoherent memory via image loads/stores, which are essentially the ability of a shader to read and write to image data. In short, SSBOs can be written into the shader of an example OpenGL API such that they can assign identifiers and/or indices to the video frame data rendered by the 3D video game and store them in its memory.

FIG. 1 is a schematic illustration of a first example distributed scalable video coding system 100. The distributed scalable video coding system 100 of the illustrated example includes an example remote data source 102 and an example client device 116. In some examples, the remote data source 102 can be a cloud server that executes an example three-dimensional (3D) video game graphics engine to generate example video frame data with an example OpenGL API. In some examples, the client device 116 can be an example personal computer (PC) operated by a user. The example remote data source 102 illustrated in FIG. 1 transmits multiple types of example video bitstream data to the example client device 116 simultaneously via an example network 114.

The example remote data source 102 illustrated in FIG. 1 includes an example video frame data generator circuitry 104 that can generate example full video frame data 106. In some examples, the video frame data generator circuitry 104 can be the 3D video game graphics engine that implements the OpenGL API to generate the example full video frame data 106. In the illustrated example, the video frame data generator circuitry 104 send the example full video frame data 106 to example encoder circuitry 108.

The example remote data source 102 illustrated in FIG. 1 includes the example encoder circuitry 108 to compress the full video frame data 106 (using SVC) into an example base-layer bitstream 110 and one or more example auxiliary-layer bitstream(s) 112. In some examples, the encoder circuitry 108 downscales the full video frame data 106, encodes the downscaled frame data using a DCT and quantization, and then decodes the compressed frame data using IQ and an IDCT to result in a reconstructed base-layer frame data. The encoder circuitry 108 determines the data-level difference between the reconstructed base-layer frame data and the full video frame data 106 and then encodes the resultant data difference to output the example auxiliary-layer bitstream(s) 112. In some examples, the encoder circuitry 108 transmits the auxiliary-layer bitstream(s) 112 with the corresponding base-layer bitstream 110 to the example client device 116 via an example network 114. In some examples, the network 114 illustrated in FIG. 1 is an example internet system that allows for data communication between the one or more example client device(s) 116 and the example remote data source 102.

The example client device 116 illustrated in FIG. 1 can include an example decoder circuitry 122 that can decompress the base-layer bitstream 110 into example base-layer frame data 130 and the auxiliary-layer bitstream(s) 112 into example auxiliary-layer frame data 124. In some examples, the example decoder circuitry 122 can decompress the base-layer bitstream 110 and the auxiliary-layer bitstream(s) 112 using variable length decoding (VLD), inverse quantization (IQ), and an inverse discrete cosine transform (IDCT). In the illustrated example, the decoder circuitry 122 outputs the example base-layer frame data 130 and the example auxiliary-layer frame data 124.

The example client device 116 illustrated in FIG. 1 includes example frame reconstruction circuitry 126 that merges the base-layer frame data 130 and the auxiliary-layer frame data 124. The example frame reconstruction circuitry 126 can merge the two sets of frame data to output an example reconstructed video frame data 128. In some examples, the reconstructed video frame data 128 output can resemble the full video frame data 106 with some level of degradation in quality depending on the compression ratio used in the encoder circuitry 108 and/or if any example auxiliary-layer bitstreams were dropped to account for example bandwidth or example decoder circuitry 122 deficiencies. The example reconstructed full frame data 128 can then be displayed on one or more examples of a display screen (e.g., computer monitor, television, VR headset, etc.).

Figure 2:
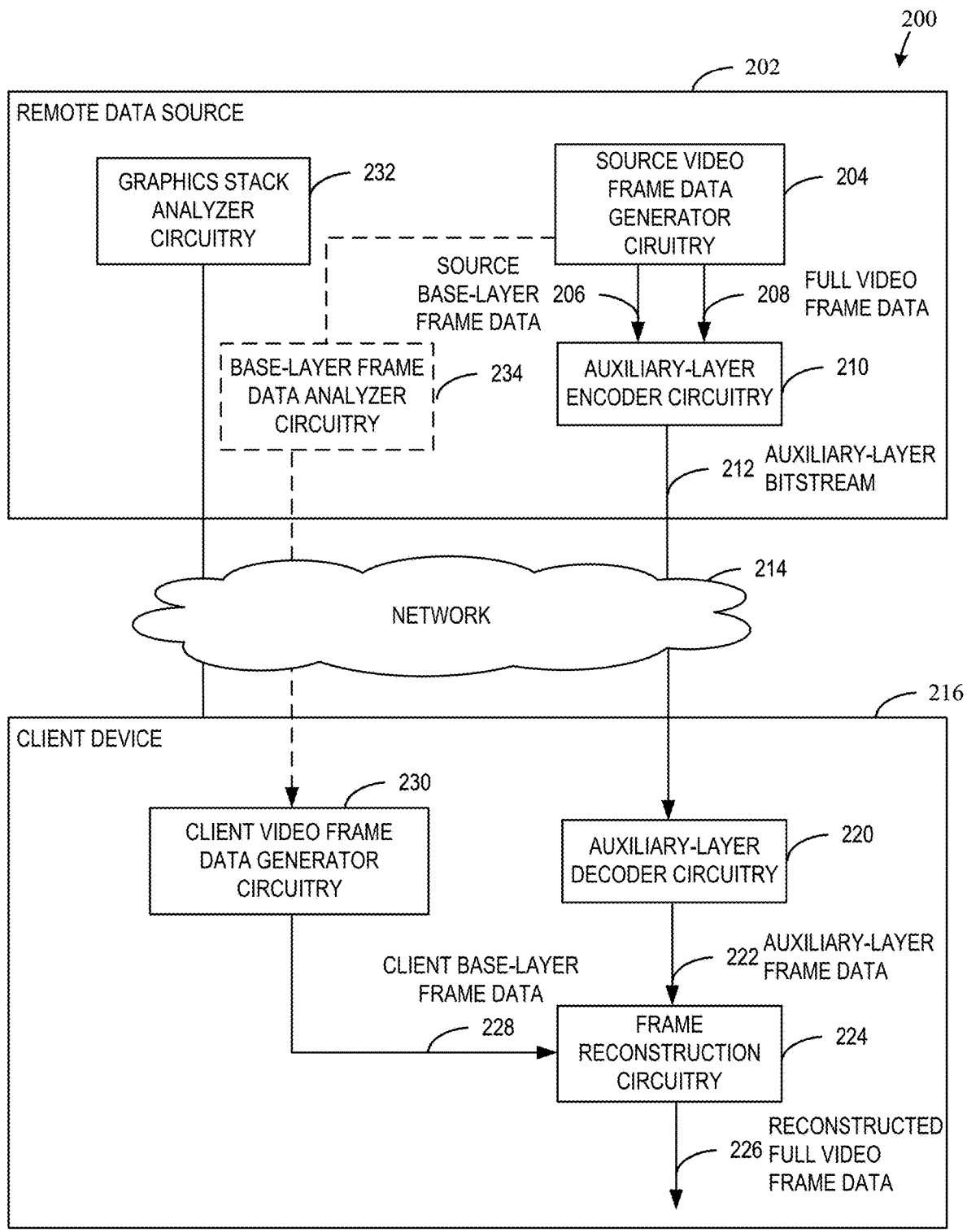
FIG. 2 is a block diagram of an example distributed scalable video coding system that implement scalable video coding for distributed source and client applications in accordance with teachings of this disclosure.

FIG. 2 is a schematic illustration of a second example distributed scalable video coding system 200 that implements scalable video coding for an example remote data source 202 and an example client device 216 in accordance with teaching of this disclosure. In some examples, the remote data source 202 can be a cloud server, Edge base station, or any other example sever communicating on a distributed network. The remote data source 202 executes an example graphics engine (e.g., 3D video game, 3D modeling software, computer-generated video, etc.) to generate example video frame data by utilizing an example graphics application programming interface (e.g., OpenGL, DirectX, Vulkan, etc.). In some examples, the client device 216 can be a personal computing device such as a laptop, a desktop computer, an electronic tablet, a smartphone, etc. The example remote data source 202 illustrated in FIG. 2 transmits multiple types of example video bitstream data to the example client device 116 simultaneously via an example network 214. In some examples, the network 214 is an internet system that allows for data communication between devices (e.g., wireless, satellite, cellular, etc.). In some examples, there can be one or more client device(s) 216 connected to one or more remote data source(s) 202

In the illustrated example, similar to the remote data source 102 of FIG. 1, the example remote data source 202 of FIG. 2 transmits one or more example auxiliary layer bitstream(s) 212 to the example client device 216. However, to reduce use of bandwidth resources, the remote data source 202 does not transmit a base-layer bitstream to the client device 216, in contrast with the remote data source 102 of FIG. 1. Rather, in the illustrated example, the client device 216 locally generates example client base-layer frame data 228 rather than decoding a base-layer bitstream from the remote device 202.

The example remote data source 202 illustrated in FIG. 2 includes example graphics stack analyzer circuitry 232 that determines graphics stack characteristics (e.g., graphics processing unit (GPU), graphics card, graphics software, etc.) implemented at the client device 216. In some examples, the graphics stack analyzer circuitry 232 can analyze the graphics stack characteristics of the client device 216 by sending a query to the graphics software of the client device 216, which can return graphics stack information (e.g., model of the GPU and/or graphics card).

The illustrated remote data source 202 of FIG. 2 includes example source video frame data generator circuitry 204 that generates example full frame video data 208 and example source base-layer frame data 206 using example graphics stack characteristics provided by the graphics stack analyzer 232. In some examples, the source video frame data generator circuitry 204 executes instructions from a graphics engine (e.g., 3D video game, 3D modeling software, computer-generated video, etc.) that generates the example full video frame data 208 by utilizing an example graphics application programming interface (API) (e.g., OpenGL, DirectX, Vulkan, etc.). The example graphics engine and/or graphics API includes the capability (e.g., written logic, smaller viewport, etc.) to generate a low-resolution version of the full video frame data 208. This low-resolution version is generated as the source base-layer frame data 206.

The example source video frame data generator circuitry 204 also generates an example source index within the full video frame data 208. The example source index is example data that indicates the placement of the full video frame data 208 in the example sequence of generated frames. The example source index can be assigned to the full video frame data 208 by writing source index data into a shader storage buffer object (SSBO) included in the frame data.

The example remote data source 202 illustrated in FIG. 2 includes example auxiliary-layer encoder circuitry 210 that can compress the first full video frame data 208 and, in the first example use case, the first base-layer frame data 206 into one or more of an example auxiliary-layer bitstream 212. The example auxiliary-layer encoder circuitry 210 can also encode the example source index into bits (e.g., supplemental enhancement information (SEI) messages) included in the auxiliary-layer bitstream 212.

In some examples of the distributed scalable video coding system 200 illustrated in FIG. 2, the example auxiliary-layer encoder circuitry 210 can use SVC techniques to compress the example full video frame data 208 into the example auxiliary-layer bitstream(s) 212 based on the example source base-layer frame data 206. In some examples, the auxiliary-layer encoder circuitry 210 can determine the data-level difference between the source base-layer frame data 206 and the full video frame data 208. The resultant data difference can be compressed using encoding methods (e.g., a DCT function, quantization, VLC, etc.) by example auxiliary-layer encoder circuitry 210 to output the auxiliary-layer bitstream 212. The example auxiliary-layer encoder circuitry 210 can then transmit the auxiliary-layer bitstream 212 to one or more example client device(s) 216 via the example network 214.

The example client device 216 illustrated in FIG. 2 includes example auxiliary-layer decoder circuitry 220 that decodes the auxiliary-layer bitstream 212 into example auxiliary-layer frame data 222. In some examples, the auxiliary-layer decoder circuitry 220 uses decoding processes (e.g., VLD, IQ, an IDCT, etc.) to decompress one or more auxiliary-layer bitstream(s) 212. The example auxiliary-layer decoder circuitry 220 also decodes the bits representing the source index back into the source index data that is included in the auxiliary-layer frame data 222.

In a first example use case of the distributed scalable video coding system 200 illustrated in FIG. 2, the source video frame data generator circuitry 204 can generate the full video frame data 208 and the source base-layer frame data 206. In this first example use case, the client device 216 generates, as described in further detail below, example client base-layer frame data 228 that is the same as the source base-layer frame data 206. The example client device 216 downloads a low-resolution version of an example graphics engine (e.g., 3D video game, 3D modeling software, computer-generated video, etc.) that includes instructions which can be executed to generate example client base-layer frame data 228 that is the same as the source base-layer frame data 206, by receiving some game status from 202. Relative to the second example use case, the first example use case reduces the bandwidth consumption, but uses more disk space at the client device 216 by downloading the example low-resolution graphics engine.

In a second example use case of the distributed scalable video coding system 200 illustrated in FIG. 2, the example remote data source 202 includes example base-layer frame data analyzer circuitry 234 that can continuously monitor the source video frame data generator circuitry 204. When the example source video frame data generator circuitry 204 generates the source base-layer frame data 206, then the base-layer frame data analyzer circuitry 234 sends a graphics API to the client device 216. The example graphics API can be executed at the client device 216 to generate example base-layer frame data of the same resolution as the source base-layer frame data 206. Relative to the first example use case, the second example use case increases the bandwidth consumption, but uses less disk space at the client device 216.

The example client device 216 of FIG. 2 includes the example client video frame data generator circuitry 230 to generate the example client base-layer frame data 228. In the first example use case, the example client video frame data generator circuitry 230 executes instructions from the example downloaded low-resolution graphics engine (e.g., 3D video game, 3D modeling software, computer-generated video, etc.) to generate example video frame data using an example graphics application programming interface (e.g., OpenGL, DirectX, Vulkan, etc.). The example client video frame data generator circuitry 230 also generates an example client index within the client base-layer frame data 228. The example client index is example data that indicates the placement of the client base-layer frame data 228 in the example sequence of generated frames. The example client index can be assigned to the client base-layer frame data 228 by writing client index data into a shader storage buffer object (SSBO) included in the frame data. In the second example use case, the client video frame data generator circuitry 230 uses the example graphics API sent from the example remote data source 202 to generate the example client base-layer frame data 228.

The example client device 216 illustrated in FIG. 2 includes the frame reconstruction circuitry 224 to merge the client base-layer frame data 228 and the auxiliary-layer frame data 222. In the illustrated example, the frame reconstruction circuitry 224 merges the two sets of frame data to output example reconstructed full video frame data 226 by adding the auxiliary-layer frame data 222 to the second base-layer frame data 228. The frame reconstruction circuitry 224 constructs the reconstructed full video frame data 226 when the source index matches the client index. The reconstructed full video frame data 226 output can resemble the full video frame data 208 with minimal levels of degradation in quality depending on the compression ratio used in the auxiliary-layer encoder circuitry 210 or if any example auxiliary-layer bitstreams were dropped to account for example bandwidth or example auxiliary-layer decoder circuitry 220 deficiencies. The example second full video frame data 226 can then be displayed on one or more examples of a display screen (e.g., computer monitor, television, VR headset, etc.).

In some examples, the example remote data source 202 of FIG. 2 includes means for analyzing the graphics stack characteristics implemented at the example client device 216. For example, the means for analyzing may be implemented by graphics stack analyzer circuitry 232. In some examples, the graphics stack analyzer circuitry 232 may be implemented by machine executable instructions such as that implemented by at least block 302 of FIG. 3 executed by processor circuitry, which may be implemented by the example processor circuitry 712 of FIG. 7, the example processor circuitry 900 of FIG. 9, and/or the example Field Programmable Gate Array (FPGA) circuitry 1000 of FIG. 10. In other examples, the graphics stack analyzer circuitry 232 is implemented by other hardware logic circuitry, hardware implemented state machines, and/or any other combination of hardware, software, and/or firmware. For example, the graphics stack analyzer circuitry 232 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example remote data source 202 of FIG. 2 includes means for generating the full video frame data 208 and the source base-layer frame data 206. For example, the means for generating may be implemented by source video frame data generator circuitry 204. In some examples, the source video frame data generator circuitry 204 may be implemented by machine executable instructions such as that implemented by at least blocks 304 of FIGS. 3 and 4 executed by processor circuitry, which may be implemented by the example processor circuitry 712 of FIG. 7, the example processor circuitry 900 of FIG. 8, and/or the example Field Programmable Gate Array (FPGA) circuitry 1000 of FIG. 10. In other examples, the source video frame data generator circuitry 204 is implemented by other hardware logic circuitry, hardware implemented state machines, and/or any other combination of hardware, software, and/or firmware. For example, the source video frame data generator circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example remote data source 202 of FIG. 2 includes means for analyzing frame data of the source base-layer frame data 206. For example, the means for analyzing may be implemented by base-layer frame data analyzer circuitry 234. In some examples, the base-layer frame data analyzer circuitry 234 may be implemented by machine executable instructions such as that implemented by at least block 306 of FIG. 3 executed by processor circuitry, which may be implemented by the example processor circuitry 712 of FIG. 7, the example processor circuitry 900 of FIG. 9, and/or the example Field Programmable Gate Array (FPGA) circuitry 1000 of FIG. 10. In other examples, the base-layer frame data analyzer circuitry 234 is implemented by other hardware logic circuitry, hardware implemented state machines, and/or any other combination of hardware, software, and/or firmware. For example, the base-layer frame data analyzer circuitry 234 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example remote data source 202 of FIG. 2 includes means for encoding the full video frame data 208 and the source base-layer frame data 206. For example, the means for encoding may be implemented by auxiliary-layer encoder circuitry 210. In some examples, the auxiliary-layer encoder circuitry 210 may be implemented by machine executable instructions such as that implemented by at least block 308 of FIG. 3 executed by processor circuitry, which may be implemented by the example processor circuitry 712 of FIG. 7, the example processor circuitry 900 of FIG. 9, and/or the example Field Programmable Gate Array (FPGA) circuitry 1000 of FIG. 10. In other examples, the auxiliary-layer encoder circuitry 210 is implemented by other hardware logic circuitry, hardware implemented state machines, and/or any other combination of hardware, software, and/or firmware. For example, the auxiliary-layer encoder circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example client device 216 of FIG. 2 includes means for generating the client base-layer frame data 228. For example, the means for generating may be implemented by client video frame data generator circuitry 230. In some examples, the client video frame data generator circuitry 230 may be implemented by machine executable instructions such as that implemented by at least blocks 310 of FIGS. 3 and 5 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the client video frame data generator circuitry 230 is implemented by other hardware logic circuitry, hardware implemented state machines, and/or any other combination of hardware, software, and/or firmware. For example, the client video frame data generator circuitry 230 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example client device 216 of FIG. 2 includes means for decoding the auxiliary-layer bitstream 212. For example, the means for decoding may be implemented by auxiliary-layer decoder circuitry 220. In some examples, the auxiliary-layer decoder circuitry 220 may be implemented by machine executable instructions such as that implemented by at least block 312 of FIG. 3 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the auxiliary-layer decoder circuitry 220 is implemented by other hardware logic circuitry, hardware implemented state machines, and/or any other combination of hardware, software, and/or firmware. For example, the auxiliary-layer decoder circuitry 220 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example client device 216 of FIG. 2 includes means for reconstructing the second full video frame data 226. For example, the means for reconstructing may be implemented by frame reconstruction circuitry 224. In some examples, the frame reconstruction circuitry 224 may be implemented by machine executable instructions such as that implemented by at least blocks 314 of FIGS. 3 and 6 executed by processor circuitry, which may be implemented by the example processor circuitry 812 of FIG. 8, the example processor circuitry 900 of FIG. 8, and/or the example Field Programmable Gate Array (FPGA) circuitry 1000 of FIG. 10. In other examples, the frame reconstruction circuitry 224 is implemented by other hardware logic circuitry, hardware implemented state machines, and/or any other combination of hardware, software, and/or firmware. For example, the frame reconstruction circuitry 224 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the distributed scalable video coding system 200 of FIG. 2 is illustrated in FIG. 2, one or more of the elements, processes, and/or devices illustrated in FIG. 2 may be combined, divided, re-arranged, omitted, eliminated, and/or implemented in any other way. Further, the example graphics stack analyzer circuitry 232, the example source video frame data generator circuitry 204, the example base-layer frame data analyzer circuitry 234, the example auxiliary-layer encoder circuitry 210, the example client video frame data generator circuitry 230, the example auxiliary-layer decoder circuitry 220, the example frame reconstruction circuitry 224, and/or, more generally, the example distributed scalable video coding system 200 of FIG. 2, may be implemented by hardware, software, firmware, and/or any combination of hardware, software, and/or firmware. Thus, for example, any of the example graphics stack analyzer circuitry 232, the example source video frame data generator circuitry 204, the example base-layer frame data analyzer circuitry 234, the example auxiliary-layer encoder circuitry 210, the example client video frame data generator circuitry 230, the example auxiliary-layer decoder circuitry 220, the example frame reconstruction circuitry 224, and/or, more generally, the example distributed scalable video coding system 200, could be implemented by processor circuitry, analog circuit(s), digital circuit(s), logic circuit(s), programmable processor(s), programmable microcontroller(s), graphics processing unit(s) (GPU(s)), digital signal processor(s)

(DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example graphics stack analyzer circuitry 232, the example source video frame data generator circuitry 204, the example base-layer frame data analyzer circuitry 234, the example auxiliary-layer encoder circuitry 210, the example client video frame data generator circuitry 230, the example auxiliary-layer decoder circuitry 220, and/or the example frame reconstruction circuitry 224 is/are hereby expressly defined to include a non-transitory computer readable storage device or storage disk such as a memory, a digital versatile disk (DVD), a compact disk (CD), a Blu-ray disk, etc., including the software and/or firmware. Further still, the example distributed scalable video coding system 200 of FIG. 2 may include one or more elements, processes, and/or devices in addition to, or instead of, those illustrated in FIG. 2, and/or may include more than one of any or all of the illustrated elements, processes and devices.

Figure 3:
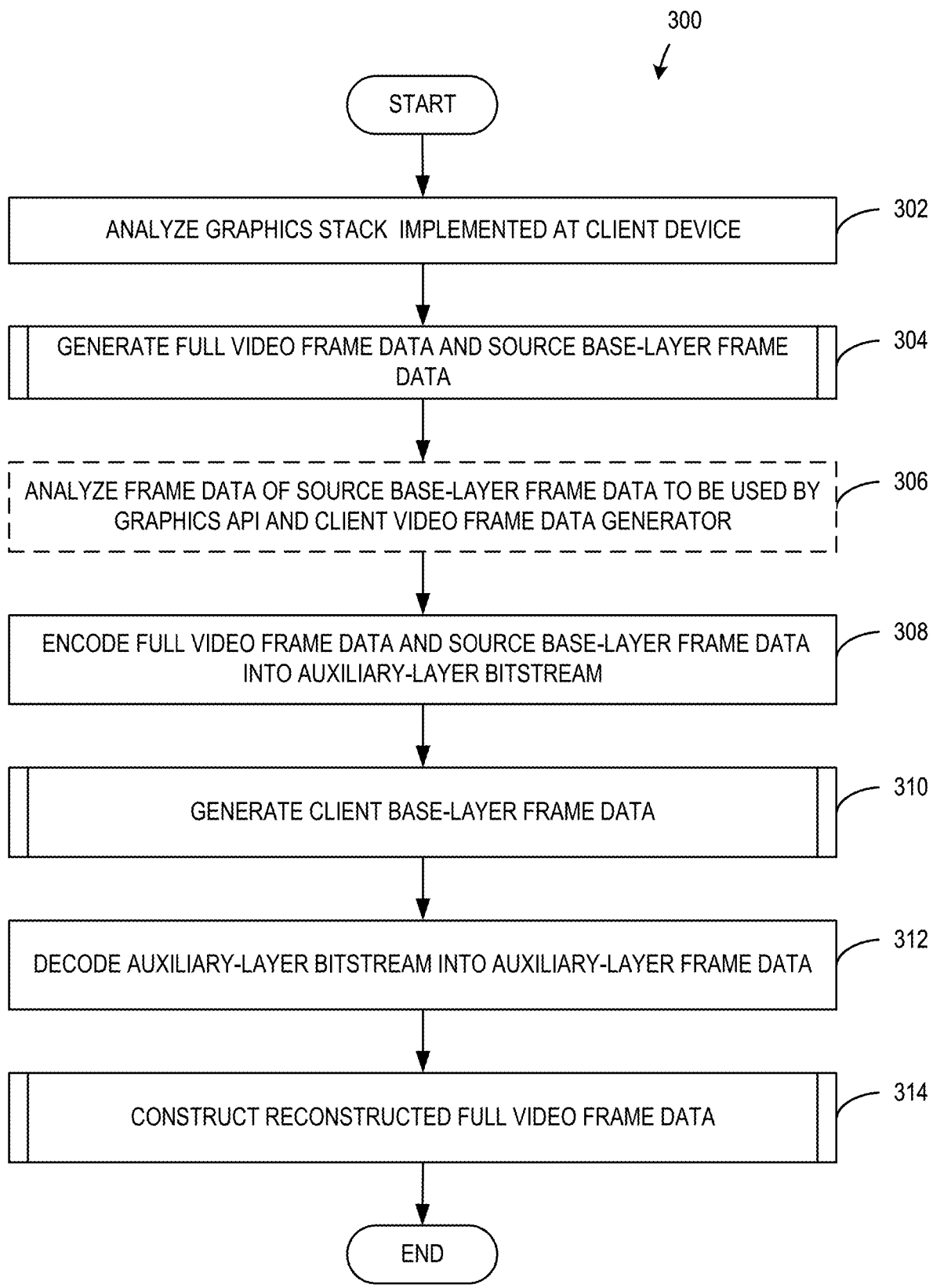
FIG. 3 is a flowchart representative of example machine readable instructions that may be executed by example processor circuitry to implement the distributed scalable video coding system of FIG. 2.
Figure 4:
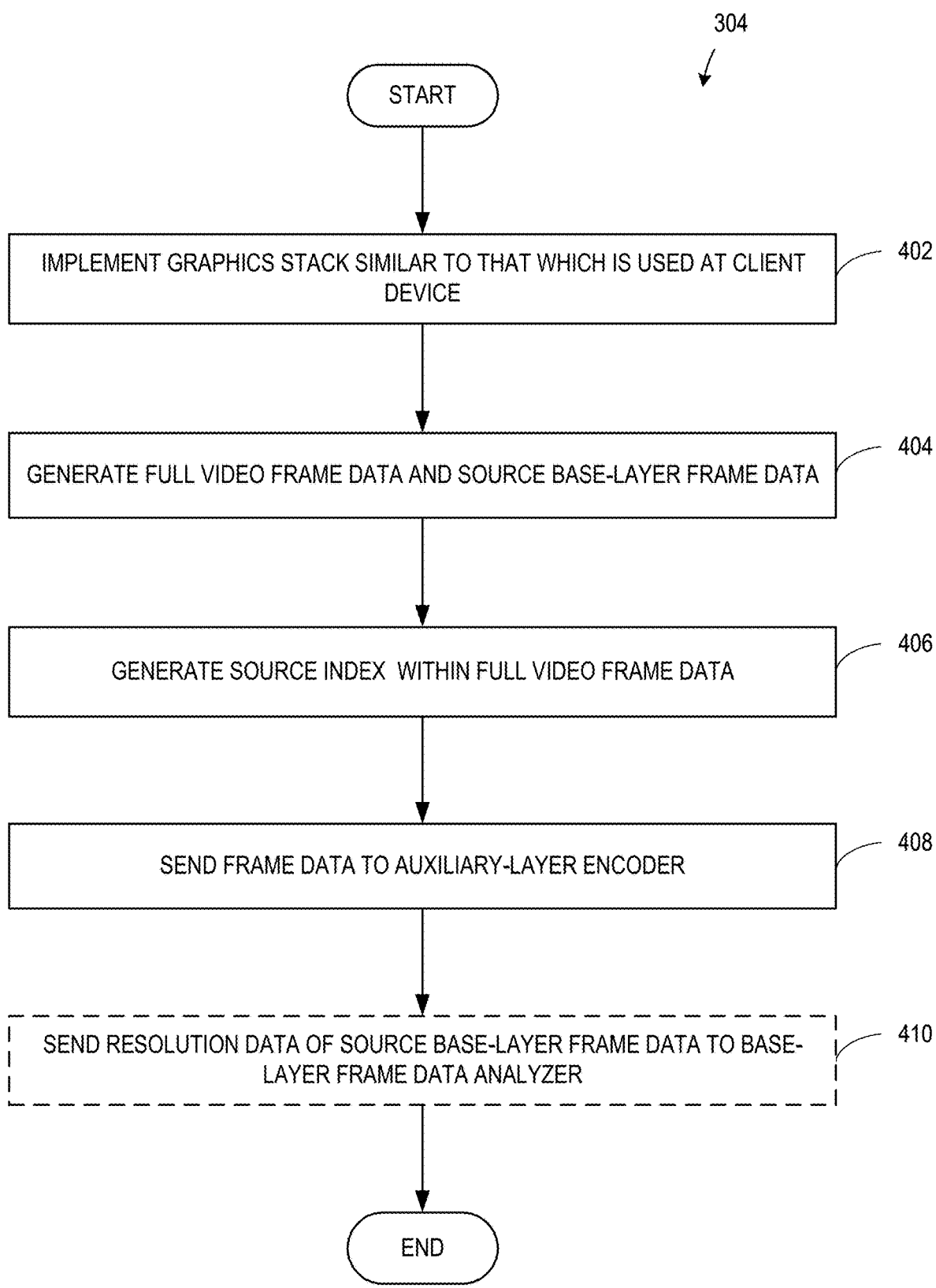
FIG. 4 is a flowchart representative of example machine readable instructions that may be executed by example processor circuitry to implement example source video frame data generator circuitry included in an example data source of the distributed scalable video coding system of FIG. 2.

A flowchart representative of example hardware logic circuitry, machine readable instructions, hardware implemented state machines, and/or any combination thereof for implementing the remote data source 202 of FIG. 2 is shown in FIGS. 3 and 4. The machine readable instructions may be one or more executable programs or portion(s) of an executable program for execution by processor circuitry, such as the processor circuitry 712 shown in the example processor platform 700 discussed below in connection with FIGS. 3 and 4 and/or the example processor circuitry discussed below in connection with FIGS. 3 and 4. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 3 and 4, many other methods of implementing the example remote data source 202 of may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

Figure 5:
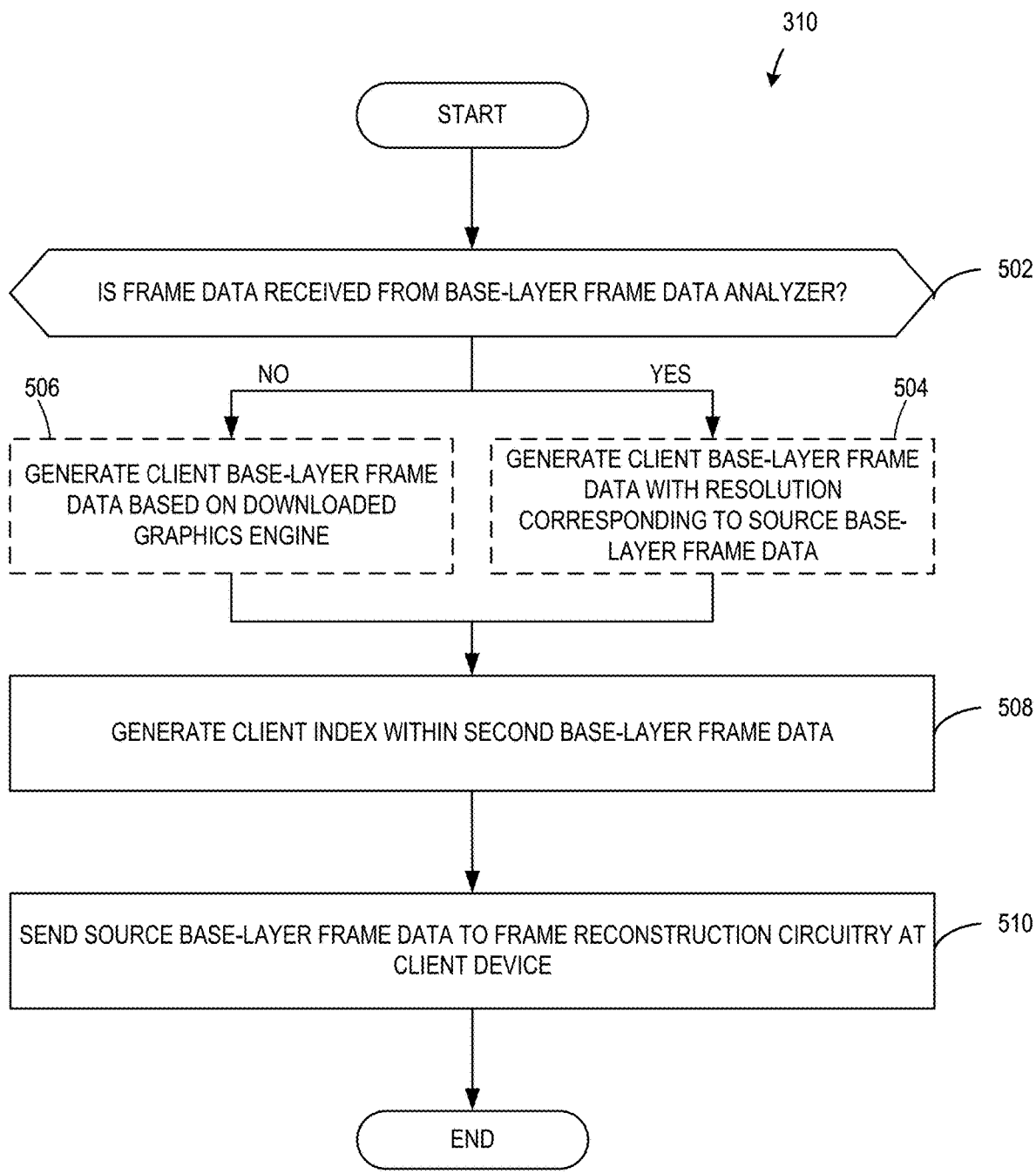
FIG. 5 is a flowchart representative of example machine readable instructions that may be executed by example processor circuitry to implement example client video frame data generator circuitry included in an example client device of the distributed scalable video coding system of FIG. 2.
Figure 6:
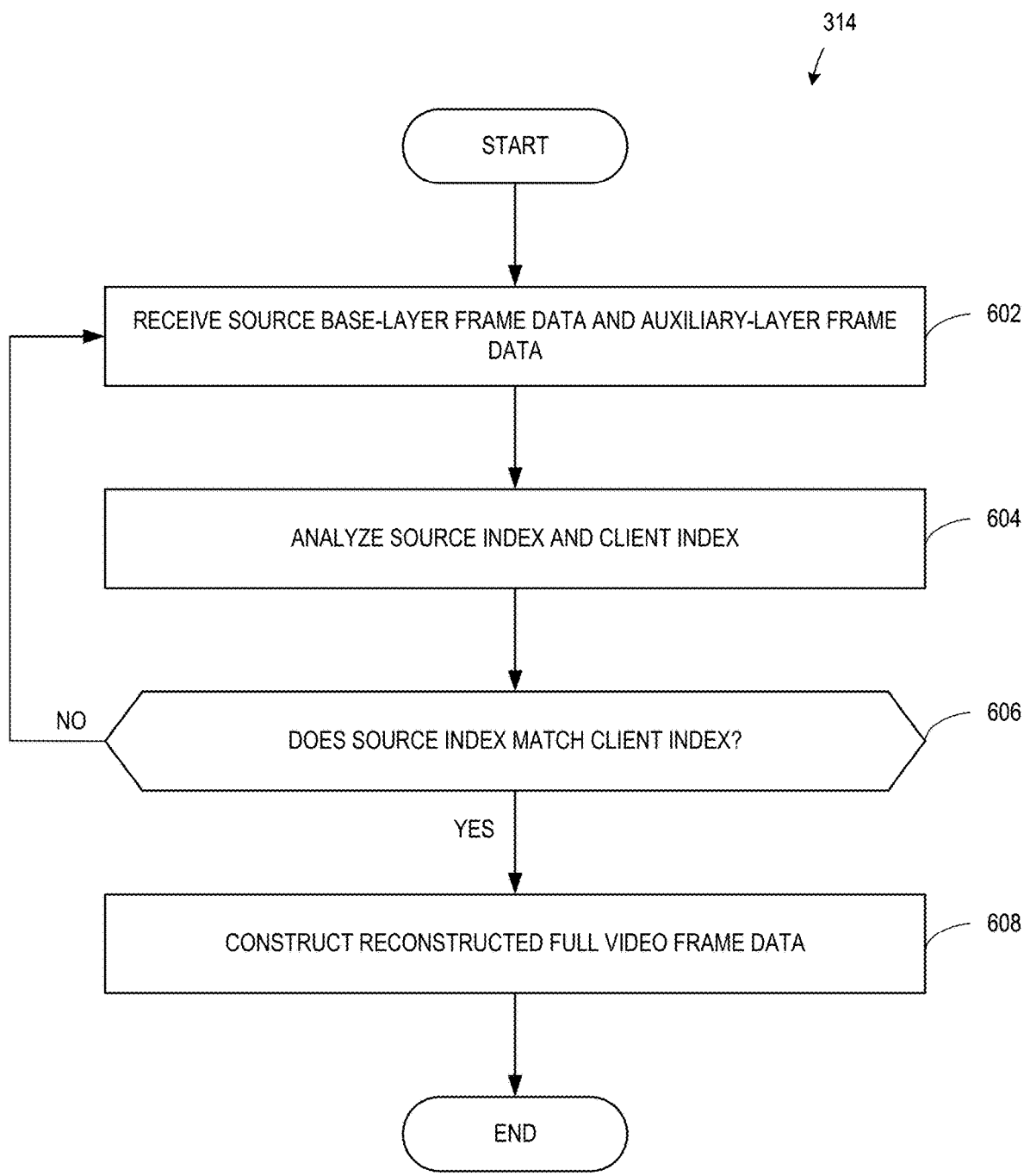
FIG. 6 is a flowchart representative of example machine readable instructions that may be executed by example processor circuitry to implement example frame reconstruction circuitry included in the example client device of the distributed scalable video coding system of FIG. 2.

A flowchart representative of example hardware logic circuitry, machine readable instructions, hardware implemented state machines, and/or any combination thereof for implementing the client device 216 of FIG. 2 is shown in FIGS. 3, 5, and 6. The machine readable instructions may be one or more executable programs or portion(s) of an executable program for execution by processor circuitry, such as the processor circuitry 812 shown in the example processor platform 800 discussed below in connection with FIGS. 3, 5, and 6 and/or the example processor circuitry discussed below in connection with FIGS. 3, 5, and 6. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 3, 5, and 6, many other methods of implementing the example client device 216 of may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 3-6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions and/or example operations 300 that may be executed and/or instantiated by one or more processors to implement the distributed scalable video coding system of FIG. 2 to transmit frame data from the remote data source 202 to one or more client device(s) 216.

The machine readable instructions and/or operations 300 of FIG. 3 begin at block 302, at which the graphics stack analyzer circuitry 232 illustrated in FIG. 2 analyzes the graphics stack characteristics implemented at one or more of the client device(s) 216.

At block 304, the source video frame data generator circuitry 204 generates the full video frame data 208 and the source base-layer frame data 206. The source video frame data generator circuitry 204 can also generate a source index within the full video frame data 208 that contains a first index of the frame data that indicates the placement of the full video frame data 208 in the example sequence of generated frames.

At block 306, in a second example use case, the base-layer frame data analyzer circuitry 234 analyzes the frame data of the source base-layer frame data 206. The base-layer frame data analyzer circuitry 234 transmits that frame data to one or more of the client device(s) 216 with a graphics API to inform a client base-layer frame data generator 230 how to generate client base-layer frame data 228 that is the same as the source base-layer frame data 206.

At block 308, the auxiliary-layer encoder circuitry 210 compresses the full video frame data 208 into the auxiliary-layer bitstream 212. The auxiliary-layer encoder circuitry 210 then sends the auxiliary-layer bitstreams 212 to the client device(s) 216 via the network 214.

At block 310, the client video frame data generator circuitry 230 generates the client base-layer frame data 228 at the client device(s) 216. The client video frame data generator circuitry 230 can also generate a client index that indicates the placement of the source base-layer frame data 208 in the example sequence of generated frames. In the first example use case, the client video frame data generator circuitry 230 can generate the client base-layer frame data 228 based on a low-resolution version of the graphics engine downloaded at the client device 216. In the second example use case, the client video frame data generator circuitry 230 can generate the client base-layer frame data 228 based on a graphics API sent from the remote data source 202.

At block 312, the auxiliary-layer decoder circuitry 220 decompresses the auxiliary-layer bitstream 212 into the auxiliary-layer frame data 222. The auxiliary-layer decoder circuitry 220 can also decompress the encoded source index.

At block 314, the frame reconstruction circuitry 224 constructs the client base-layer frame data 228 and the auxiliary-layer frame data 222 into the reconstructed full video frame data 226. The frame reconstruction circuitry 224 constructs the reconstructed full video frame data 226 if check that the source index and the client index match.

FIG. 4 is a flowchart representative of example machine readable instructions and/or example operations 304 that may be executed and/or instantiated by processor circuitry to implement the example source video frame data generator circuitry 204 of FIG. 2 to generate the full video frame data 208 and the source base-layer frame data 206.

The machine readable instructions and/or operations 304 of FIG. 4 begin at block 402, at which the source video frame data generator circuitry 204 receives the graphics stack characteristics of the client device(s) 216 as analyzed by the graphics stack analyzer circuitry 232. The source video frame data generator circuitry 204 then implements a similar graphics stack to perform frame data generation.

At block 404, the source video frame data generator circuitry 204 generates both the full video frame data 208 and the source base-layer frame data 206 based on a graphics engine utilizing an example graphics API. The example graphics engine and/or graphics API includes the capability to generate a low-resolution version of the full video frame data 208. This low-resolution version is generated as the source base-layer frame data 206.

At block 406, the source video frame data generator circuitry 204 generates the source index within the source full video frame data 208 that indicates the full video frame data 208. The source index indicates the placement of the full video frame data 208 within the sequence of video frame data generated by the source video frame data generator circuitry 204.

At block 408, the source video frame data generator circuitry 204 sends the full video frame data 208 and the source base-layer frame data 206 to the auxiliary-layer encoder circuitry 210.

At block 410, in the second example use case, the source video frame data generator circuitry 204 sends the source base-layer frame data 206 to the base-layer frame data analyzer circuitry 234 when called.

FIG. 5 is a flowchart representative of example machine readable instructions and/or example operations 310 that may be executed and/or instantiated by processor circuitry to implement the client video frame data generator circuitry 230 to generate the client base-layer frame data 228.

The machine readable instructions and/or operations 310 of FIG. 5 begin at block 502, at which the client video frame data generator circuitry 230 determines if the source base-layer frame data 206 and graphics API are received from the base-layer frame data analyzer circuitry 234.

At block 504, in the second example use case, the source base-layer frame data 206 and graphics API are received by the client video frame data generator circuitry 230. The client video frame data generator circuitry 230 then generates the client base-layer frame data 228 with the same pixel resolution as the source base-layer frame data 206.

At block 506, in the first example use case, the client video frame data generator circuitry 230 generates the client base-layer frame data 228 based on the low-resolution version of the graphics engine downloaded at the client device 216. The client video frame data generator circuitry 230 then generates the client base-layer frame data 228 with the same pixel resolution as the source base-layer frame data 206.

At block 508, the client video frame data generator circuitry 230 generates the client index within the client base-layer frame data 228. The client index indicates the placement of the client base-layer frame data 228 within the sequence of video frame data generated by the client video frame data generator circuitry 230.

At block 510, the client video frame data generator circuitry 230 sends the client base-layer frame data 228 with the client index to the frame reconstruction circuitry 224.

FIG. 6 is a flowchart representative of example machine readable instructions and/or example operations 314 that may be executed and/or instantiated by processor circuitry to implement the frame reconstruction circuitry 224 to reconstruct the reconstructed full video frame data 226.

The machine readable instructions and/or operations 314 of FIG. 6 begin at block 602, at which the frame reconstruction circuitry 224 receives the client base-layer frame data 228 from the client video frame data generator circuitry 230 and the auxiliary-layer frame data 222 from the auxiliary-layer decoder circuitry 220.

At block 604, the frame reconstruction circuitry 224 analyzes the source index and the client index within the auxiliary-layer frame data 222 and the client base-layer frame data 228, respectively.

At block 606, the frame reconstruction circuitry 224 determines if the source index matches the client index. If the indices do not match, the machine readable instructions and/or operations 314 of FIG. 6 return to block 602. If the indices do match, the machine readable instructions and/or operations 314 of FIG. 6 progress to block 608.

At block 608, the frame reconstruction circuitry 224 constructs the reconstructed full video frame data 226 by merging the image data of the auxiliary-layer frame data 222 and the client base-layer frame data 228.

Figure 7:
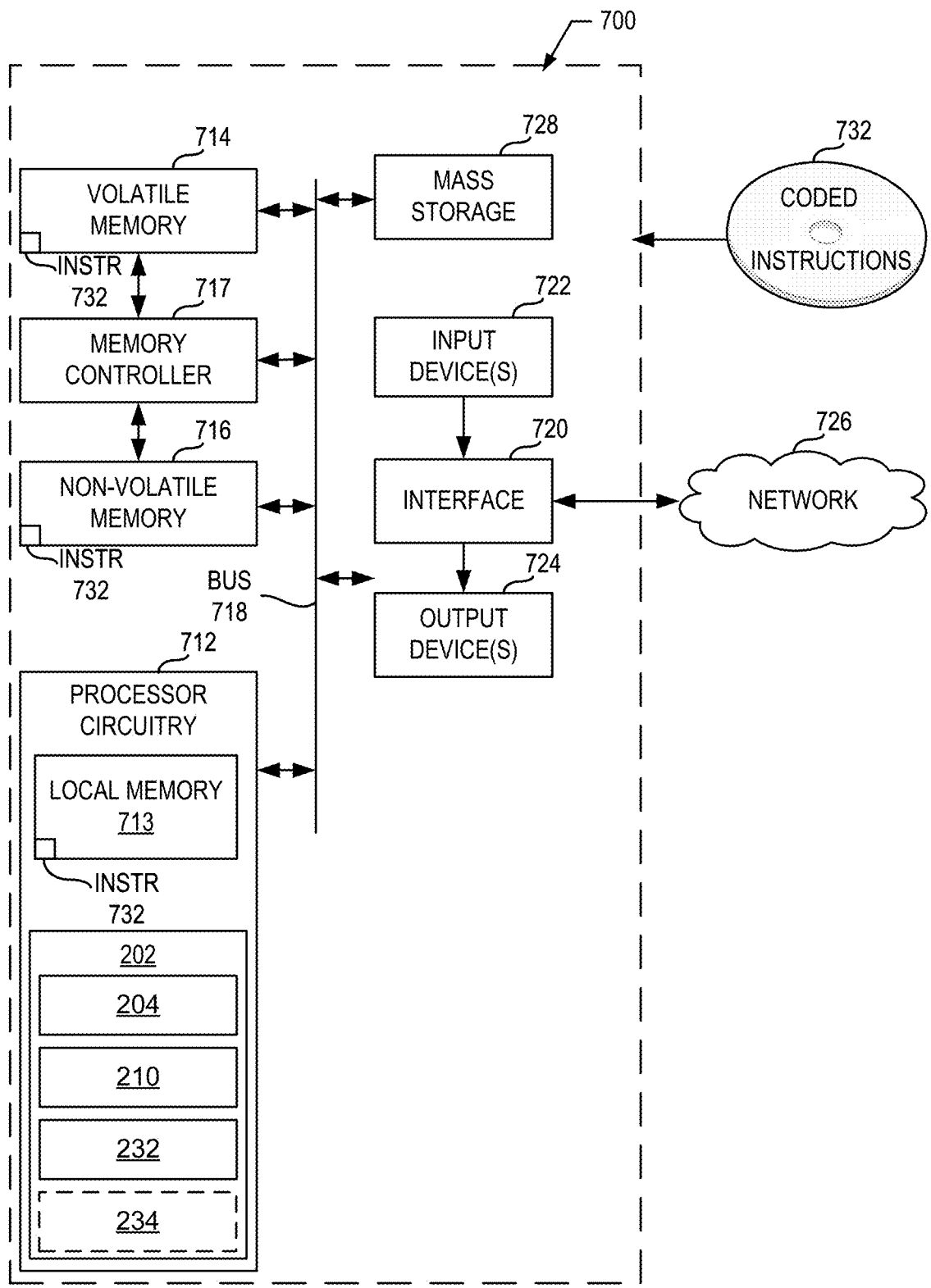
FIG. 7 is a block diagram of an example processing platform including processor circuitry structured to execute the example machine readable instructions of FIGS. 3 and 4 to implement the example data source of FIG. 2.

FIG. 7 is a block diagram of an example processor platform 700 structured to execute and/or instantiate the machine readable instructions and/or operations of FIGS. 3 and 4 to implement the remote data source 202 of FIG. 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the graphics stack analyzer circuitry 232, the first video frame data generator circuitry 204, the base-layer frame data analyzer circuitry 234, and the auxiliary-layer encoder circuitry 210.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output devices 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 732, which may be implemented by the machine readable instructions of FIGS. 3 and 4, may be stored in the mass storage device 728, in the volatile memory 714, in the non-volatile memory 716, and/or on a removable non-transitory computer readable storage medium such as a CD or DVD.

Figure 8:
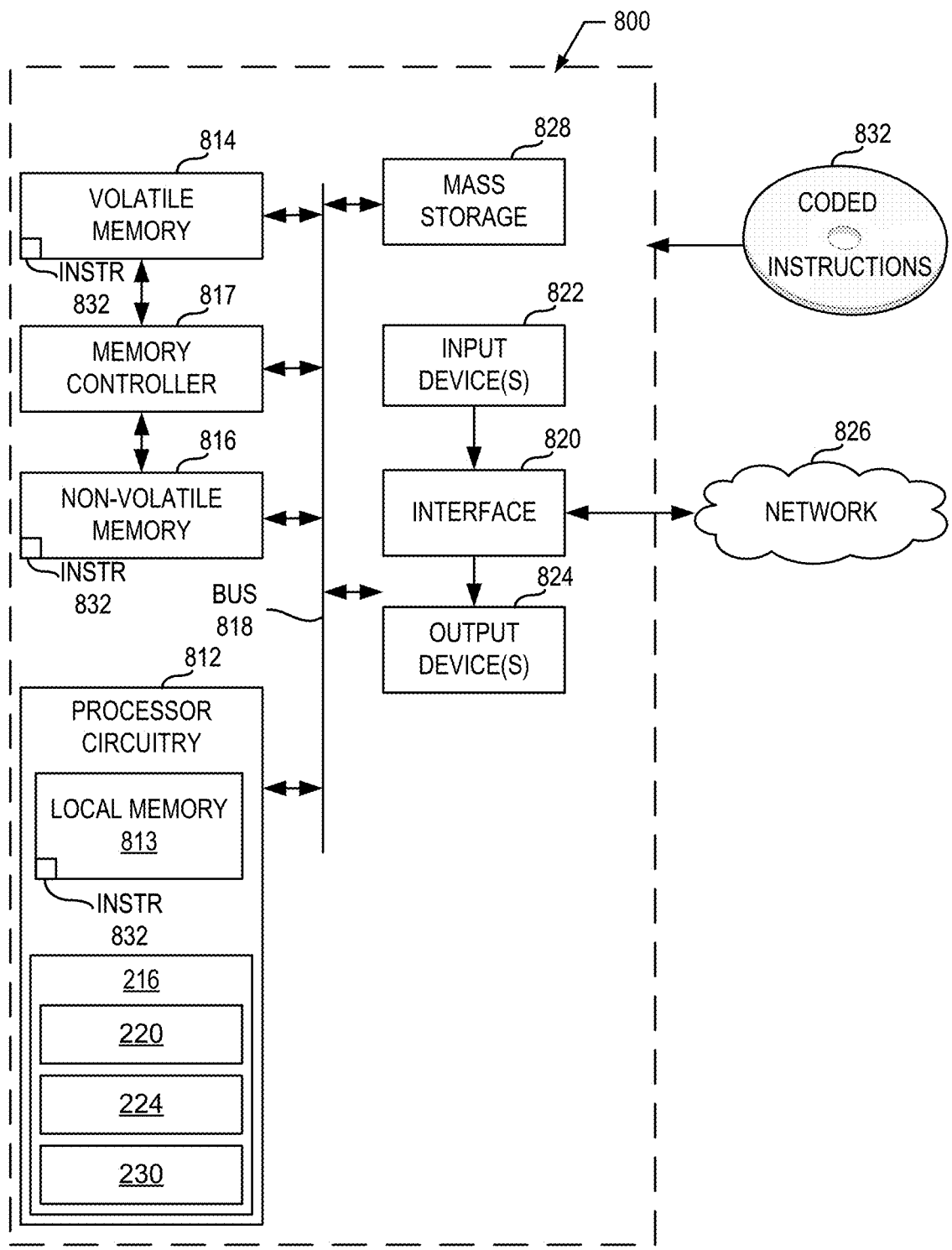
FIG. 8 is a block diagram of an example processing platform including processor circuitry structured to execute the example machine readable instructions of FIGS. 3, 5, and 6 to implement the example client device of FIG. 2.

FIG. 8 is a block diagram of an example processor platform 800 structured to execute and/or instantiate the machine readable instructions and/or operations of FIGS. 3, 5, and 6 to implement the client device 216 of FIG. 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the second video frame data generator circuitry 230, the auxiliary-layer decoder circuitry 220, and the frame reconstruction circuitry 224.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output devices 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 832, which may be implemented by the machine readable instructions of FIGS. 3, 5, and 6, may be stored in the mass storage device 828, in the volatile memory 814, in the non-volatile memory 816, and/or on a removable non-transitory computer readable storage medium such as a CD or DVD.

Figure 9:
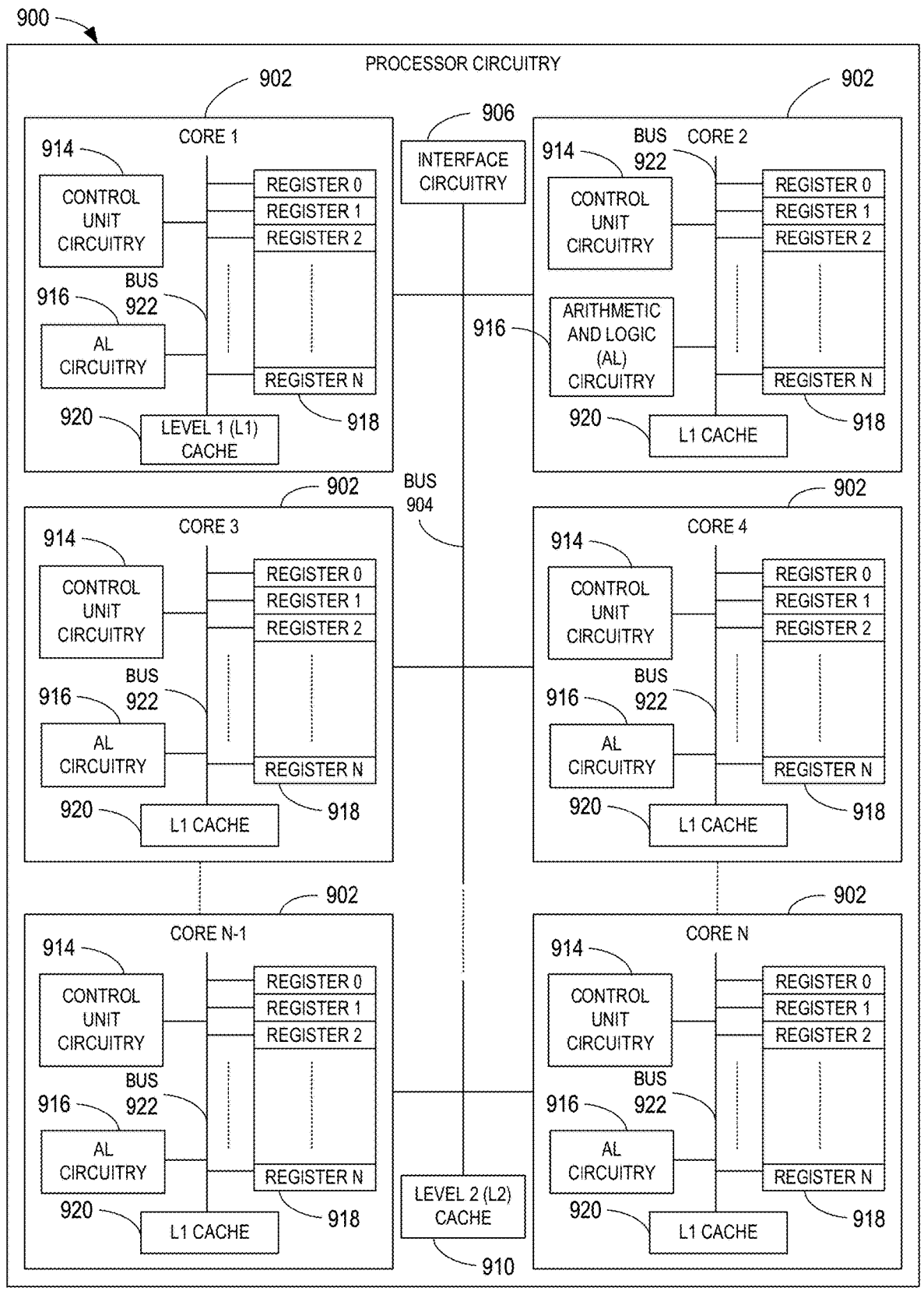
FIG. 9 is a block diagram of an example implementation of the processor circuitry of FIGS. 7 and/or 8.

FIG. 9 is a block diagram of an example implementation of the processor circuitry 712 and/or 812 of FIGS. 7-8. In this example, the processor circuitry 712 and/or 812 of FIG. 7-8 is implemented by a microprocessor 900. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowchart of FIGS. 3-6.

The cores 902 may communicate by an example bus 904. In some examples, the bus 904 may implement a communication bus to effectuate communication associated with one(s) of the cores 902. For example, the bus 904 may implement at least one of an Inter-Integrated Circuit (I2C) bus, a Serial Peripheral Interface (SPI) bus, a PCI bus, or a PCIe bus. Additionally or alternatively, the bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2_cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 714, 716, 814, 816 of FIGS. 7-8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the L1 cache 920, and an example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The bus 920 may implement at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
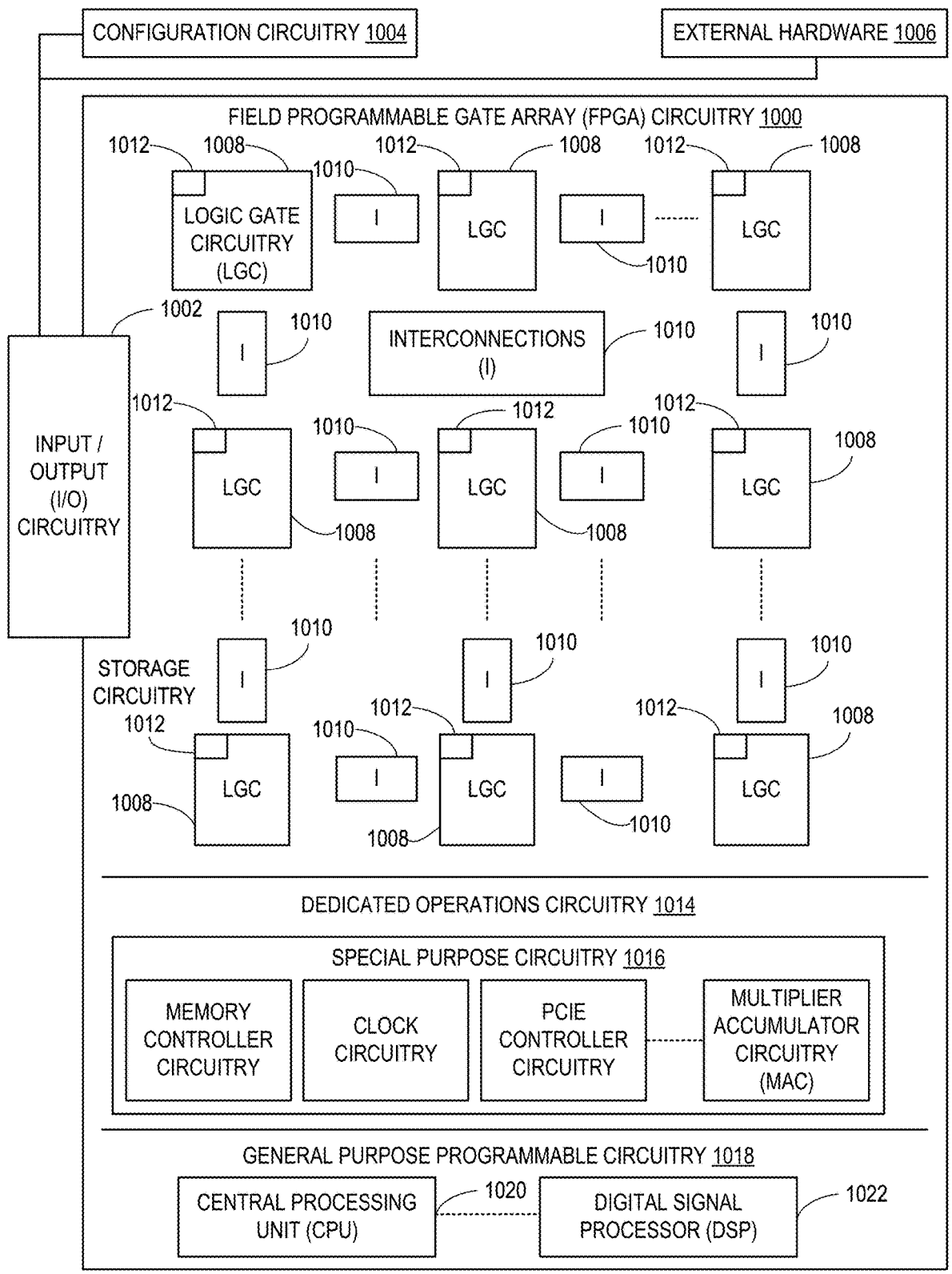
FIG. 10 is a block diagram of another example implementation of the processor circuitry of FIGS. 7 and/or 8.

FIG. 10 is a block diagram of another example implementation of the processor circuitry 712 and/or 812 of FIGS. 7-8. In this example, the processor circuitry 712 and/or 812 is implemented by FPGA circuitry 1000. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowcharts of FIG. 3-6 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowcharts of FIG. 3-6. In particular, the FPGA 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIG. 3-6. As such, the FPGA circuitry 1000 may be structured to effectively instantiate some or all of the machine readable instructions of the flowcharts of FIG. 3-6 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIG. 3-6 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware (e.g., external hardware circuitry) 1006. For example, the configuration circuitry 1004 may implement interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may implement the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and interconnections 1010 are configurable to instantiate one or more operations that may correspond to at least some of the machine readable instructions of FIGS. 3-6 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 712 and/or 812 of FIGS. 7-8, many other approaches are contemplated. For example, as mentioned above, modern FPGA circuitry may include an on-board CPU, such as one or more of the example CPU 1020 of FIG. 10. Therefore, the processor circuitry 712 and/or 812 of FIGS. 7-8 may additionally be implemented by combining the example microprocessor 900 of FIG. 9 and the example FPGA circuitry 1000 of FIG. 10. In some such hybrid examples, a first portion of the machine readable instructions represented by the flowcharts of FIG. 3-6 may be executed by one or more of the cores 902 of FIG. 9 and a second portion of the machine readable instructions represented by the flowcharts of FIG. 3-6 may be executed by the FPGA circuitry 1000 of FIG. 10.

In some examples, the processor circuitry 712 and/or 812 of FIG. 7-8 may be in one or more packages. For example, the processor circuitry 900 of FIG. 9 and/or the FPGA circuitry 1000 of FIG. 10 may be in one or more packages. In some examples, an XPU may be implemented by the processor circuitry 712 and/or of FIG. 7-8, which may be in one or more packages. For example, the XPU may include a CPU in one package, a DSP in another package, a GPU in yet another package, and an FPGA in still yet another package.

Figure 11:
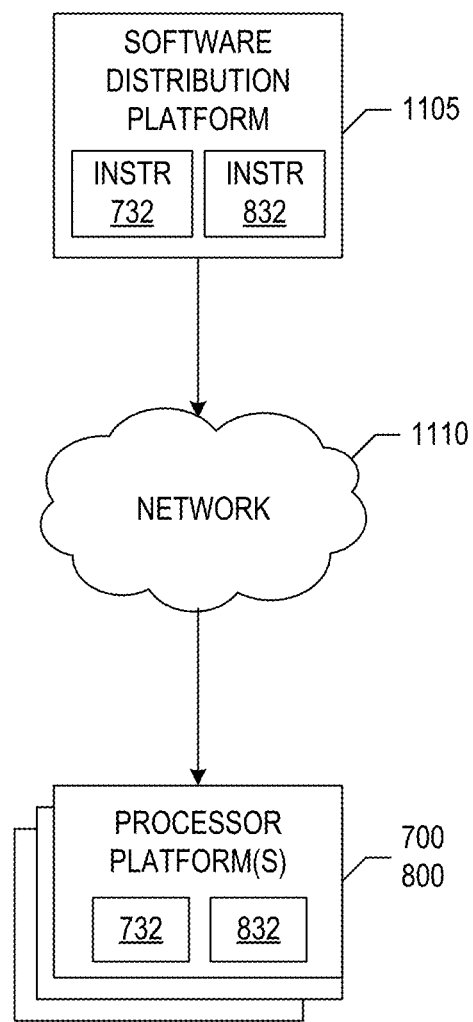
FIG. 11 is a block diagram of an example software distribution platform (e.g., one or more servers) to distribute software (e.g., software corresponding to the example machine readable instructions of FIGS. 3, 4, 5 and/or 6) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 732 and/or 832 of FIGS. 7-8 to hardware devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions 732 and/or 832 of FIGS. 7-8. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 732 and/or 832, which may correspond to the example machine readable instructions 300, 304, 310, and 314 of FIGS. 3-6 as described above. The one or more servers of the example software distribution platform 1105 are in communication with a network 1110, which may correspond to any one or more of the Internet and/or any of the example networks 1110 of FIG. 11 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 732 and/or 832 from the software distribution platform 1105. For example, the software, which may correspond to the example machine readable instructions 300, 304, 310, and 314 of FIGS. 3-6, may be downloaded to the example processor platform(s) 700 and/or 800, which is to execute the machine readable instructions 732 and/or 832 to implement the distributed scalable video coding system 200 of FIG. 2. In some examples, one or more servers of the software distribution platform 1105 periodically offer, transmit, and/or force updates to the software (e.g., the example machine readable instructions 732 and/or 832 of FIGS. 7-8) to ensure improvements, patches, updates, etc., are distributed and applied to the software at the end user devices.

Example methods, apparatus, systems, and articles of manufacture to implement scalable video coding for distributed source and client applications are disclosed herein. Example methods, apparatus, systems, and articles of manufacture to reconstruct video frames are disclosed herein. Further examples and combinations thereof include the following:

Example 1 includes an apparatus comprising at least one memory, instructions in the apparatus, and processor circuitry to execute the instructions to at least generate a base-layer frame data, decode a received auxiliary-layer bitstream into auxiliary-layer frame data, and reconstruct a full video frame data based on the base-layer frame data and the auxiliary-layer frame data.

Example 2 includes the apparatus of example 1, wherein the processor circuitry is to generate the base-layer frame data based on a graphics engine downloaded at a client device.

Example 3 includes the apparatus of example 1, wherein the processor circuitry is to generate the base-layer frame data based on frame data sent from a remote data source associated with the received auxiliary-layer bitstream.

Example 4 includes the apparatus of example 1, wherein the processor circuitry is to generate a client index associated with the base-layer frame data.

Example 5 includes the apparatus of example 1, wherein the processor circuitry is to decode a source index within the auxiliary-layer bitstream.

Example 6 includes the apparatus of example 1, wherein the processor circuitry is to confirm that a source index matches a client index, the source index associated with the auxiliary-layer frame data, the client index associated with the base-layer frame data.

Example 7 includes the apparatus of example 6, wherein the processor circuitry is to reconstruct the full video frame data in response to the source index matching the client index.

Example 8 includes an apparatus comprising at least one memory, instructions in the apparatus, and processor circuitry to execute the instructions to at least determine at least one characteristic of a graphics system associated with a client device, the graphics system including at least one of a graphics hardware system or a graphics software system, generate a full video frame data and a base-layer video frame data, encode an auxiliary-layer bitstream based on the full video frame data and on base-layer frame data, and transmit the auxiliary-layer bitstream to the client device without transmission of the base-layer frame data to the client device.

Example 9 includes the apparatus of example 8, wherein the graphics system is a first graphics system, and the processor circuitry is to generate the full video frame data and the base-layer frame data based on a second graphics system configured based on the at least one characteristic of the graphics system associated with the client device.

Example 10 includes the apparatus of example 8, wherein the processor circuitry is to generate a source index associated with the source full video frame data.

Example 11 includes the apparatus of example 10, wherein the processor circuitry is to compress the source index into an additional message within the auxiliary-layer bitstream.

Example 12 includes the apparatus of example 8, wherein the processor circuitry is to generate the base-layer frame data and the full video frame data, the base-layer frame data having lower resolution than the full video frame data.

Example 13 includes the apparatus of example 12, wherein the processor circuitry, in response to generation of the base-layer frame data, is to send frame data of the base-layer frame data to the client device.

Example 14 includes the apparatus of example 12, wherein the processor circuitry is to encode the full video frame data into the auxiliary-layer bitstream based on a difference between the full video frame data and the base-layer frame data.

Example 15 includes at least one non-transitory computer-readable medium comprising instructions that, when executed, cause a machine to at least generate a base-layer frame data, decode a received auxiliary-layer bitstream into auxiliary-layer frame data, and reconstruct a full video frame data based on the base-layer frame data and the auxiliary-layer frame data.

Example 16 includes the computer-readable medium of example 15, wherein the instructions are to cause the machine to generate the base-layer frame data based on a graphics engine downloaded at a client device.

Example 17 includes the computer-readable medium of example 15, wherein the instructions are to cause the machine to generate the base-layer frame data based on frame data sent from a remote data source associated with the received auxiliary-layer bitstream.

Example 18 includes the computer-readable medium of example 15, wherein the instructions are to cause the machine to generate a client index associated with the base-layer frame data.

Example 19 includes the computer-readable medium of example 15, wherein the instructions are to cause the machine to decode a source index within the auxiliary-layer bitstream.

Example 20 includes the computer-readable medium of example 15, wherein the instructions are to cause the machine to confirm that a source index matches a client index, the source index associated with the auxiliary-layer frame data, the client index associated with the base-layer frame data.

Example 21 includes the computer-readable medium of example 20, wherein the instructions are to cause the machine to reconstruct the full video frame data in response to the source index matching the client index.

Example 22 includes a computer-readable medium comprising instructions that, when executed, allow a machine to at least determine at least one characteristic of a first graphics system associated with a client device, the graphics system including at least one of a graphics hardware system or a graphics software system, generate a full video frame data and a base-layer video frame data, encode an auxiliary-layer bitstream based on the full video frame data and on base-layer frame data, and transmit the auxiliary-layer bitstream to the client device without transmission of the base-layer frame data to the client device.

Example 23 includes the computer-readable medium of example 22, wherein the instructions are to cause the machine to generate the full video frame data and the base-layer frame data based on a second graphics system configured based on the at least one characteristic of the graphics system associated with the client device.

Example 24 includes the computer-readable medium of example 22, wherein the instructions are to cause the machine to generate a source index associated with the source full video frame data.

Example 25 includes the computer-readable medium of example 24, wherein the instructions are to cause the machine to compress the source index into an additional message within the auxiliary-layer bitstream.

Example 26 includes the computer-readable medium of example 22, wherein the instructions are to cause the machine to generate the base-layer frame data and the full video frame data, the base-layer frame data having lower resolution than the full video frame data.

Example 27 includes the computer-readable medium of example 26, wherein the instructions are to cause the machine to, in response to generation of the base-layer frame data, send frame data of the base-layer frame data to the client device.

Example 28 includes the computer-readable medium of example 27, wherein the instructions are to cause the machine to encode the full video frame data into the auxiliary-layer bitstream based on a difference between the full video frame data and the base-layer frame data.

Example 29 includes a method comprising generating a base-layer frame data, decoding a received auxiliary-layer bitstream into auxiliary-layer frame data, and reconstructing a full video frame data based on the base-layer frame data and the auxiliary-layer frame data.

Example 30 includes the method of example 29, including generating the base-layer frame data based on a graphics engine downloaded at a client device.

Example 31 includes the method of example 29, including generating the base-layer frame data based on frame data sent from a remote data source associated with the received auxiliary-layer bitstream.

Example 32 includes the method of example 29, including generating a client index associated with the base-layer frame data.

Example 33 includes the method of example 29, including decoding a source index within the auxiliary-layer bitstream.

Example 34 includes the method of example 29, including, in response to confirming that a source index matches a client index, the source index associated with the auxiliary-layer frame data, the client index associated with the base-layer frame data.

Example 35 includes the method of example 29, including reconstructing the full video frame data in response to the source index matching the client index.

Example 36 includes a method comprising determining at least one characteristic of a first graphics system associated with a client device, the graphics system including at least one of a graphics hardware system or a graphics software system, generating a full video frame data and a base-layer video frame data, encoding an auxiliary-layer bitstream based on the full video frame data and on base-layer frame data, and transmitting the auxiliary-layer bitstream to the client device without transmission of the base-layer frame data to the client device.

Example 37 includes the method of example 36, including generating the full video frame data and the base-layer frame data based on a second graphics system configured based on the at least one characteristic of the graphics system associated with the client device.

Example 38 includes the method of example 36, including generating a source index associated with the source full video frame data.

Example 39 includes the method of example 38, including compressing the source index into an additional message within the auxiliary-layer bitstream.

Example 40 includes the method of example 36, including generating the base-layer frame data and the full video frame data, the base-layer frame data having lower resolution than the full video frame data.

Example 41 includes the method of example 40, including, in response to generating the base-layer frame data, sending frame data of the base-layer frame data to the client device.

Example 42 includes the method of example 40, including encoding the full video frame data into the auxiliary-layer bitstream based on a difference between the full video frame data and the base-layer frame data.

From the foregoing, it will be appreciated that example systems, methods, apparatus, and articles of manufacture have been disclosed that reconstruct video frames. The disclosed systems, methods, apparatus, and articles of manufacture improve the efficiency of streaming video data from a remote data source via cloud-based networks by implementing a scalable video encoder in which base-layer frame data is generated locally at a client device and, thus, does not need to be transmitted to the client device from a remote data source. In this manner, bandwidth utilization can be reduced relative to prior distributed streaming video systems. The disclosed systems, methods, apparatus, and articles of manufacture are accordingly directed to one or more improvement(s) in the operation of a machine such as a computer or other electronic and/or mechanical device.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   interface circuitry;
   instructions; and
   at least one programmable circuit to be programmed based on the instructions to at least:
      generate base-layer frame data;
      decode an auxiliary-layer bitstream into auxiliary-layer frame data;
      confirm that a source index matches a client index, the source index associated with the auxiliary-layer frame data, the client index associated with the base-layer frame data; and
      reconstruct full video frame data based on the base-layer frame data and the auxiliary-layer frame data after a determination that the source index matches the client index.

2. The apparatus of claim 1, wherein one or more of the at least one programmable circuit is to generate the base-layer frame data based on a graphics engine downloaded at a client device.

3. The apparatus of claim 1, wherein one or more of the at least one programmable circuit is to generate the base-layer frame data based on frame data sent from a remote data source associated with the auxiliary-layer bitstream.

4. The apparatus of claim 1, wherein one or more of the at least one programmable circuit is to generate the client index associated with the base-layer frame data.

5. The apparatus of claim 1, wherein one or more of the at least one programmable circuit is to decode the source index from the auxiliary-layer bitstream.

6. An apparatus comprising:
   interface circuitry;
   instructions; and
   at least one programmable circuit to be programmed based on the instructions to at least:
      determine at least one characteristic of a graphics system associated with a client device, the graphics system including at least one of a graphics hardware system or a graphics software system;
      generate full video frame data and base-layer frame data;
      generate a source index associated with the full video frame data;
      encode an auxiliary-layer bitstream based on the full video frame data and the base-layer frame data; and
      cause transmission of the auxiliary-layer bitstream to the client device without transmission of the base-layer frame data to the client device.

7. The apparatus of claim 6, wherein the graphics system is a first graphics system, and one or more of the at least one programmable circuit is to generate the full video frame data and the base-layer frame data based on a second graphics system, the second graphics system configurable based on the at least one characteristic of the first graphics system associated with the client device.

8. The apparatus of claim 6, wherein one or more of the at least one programmable circuit is to compress the source index into an additional message within the auxiliary-layer bitstream.

9. The apparatus of claim 6, wherein one or more of the at least one programmable circuit is to generate the base-layer frame data and the full video frame data, the base-layer frame data having lower resolution than the full video frame data.

10. The apparatus of claim 9, wherein one or more of the at least one programmable circuit is to, after generation of the base-layer frame data, cause transmission of at least some of the base-layer frame data to the client device.

11. The apparatus of claim 9, wherein one or more of the at least one programmable circuit is to encode the full video frame data into the auxiliary-layer bitstream based on a difference between the full video frame data and the base-layer frame data.

12. At least one non-transitory computer-readable medium comprising instructions to cause at least one programmable circuit to at least:
   generate base-layer frame data;
   decode an auxiliary-layer bitstream into auxiliary-layer frame data;
   confirm that a source index matches a client index, the source index associated with the auxiliary-layer frame data, the client index associated with the base-layer frame data; and
   reconstruct full video frame data based on the base-layer frame data and the auxiliary-layer frame data after a determination that the source index matches the client index.

13. The at least one computer-readable medium of claim 12, wherein the instructions are to cause one or more of the at least one programmable circuit to generate the base-layer frame data based on a graphics engine downloaded at a client device.

14. The at least one computer-readable medium of claim 12, wherein the instructions are to cause one or more of the at least one programmable circuit to generate the base-layer frame data based on frame data from a remote data source associated with the auxiliary-layer bitstream.

15. The at least one computer-readable medium of claim 12, wherein the instructions are to cause one or more of the at least one programmable circuit to:
  generate the client index associated with the base-layer frame data; and
  decode the source index from the auxiliary-layer bitstream.

* * * * *